United States Patent [19]

Aoki et al.

[11] Patent Number: 4,567,224

[45] Date of Patent: Jan. 28, 1986

[54] BIAXIALLY ORIENTED CONTAINER EXCELLENT IN HEAT RESISTING PROPERTY AND PRESSURE RESISTING PROPERTY

[76] Inventors: Daiichi Aoki; Yoshinori Nakamura; Hiroyuki Orimoto, all c/o Nissei ASB Machine Co., Ltd., 6100-1, Ohazaminamijo, Sakakimachi, Hanishina-gun, Nagano-, Japan

[21] Appl. No.: 715,276

[22] Filed: Mar. 25, 1985

[30] Foreign Application Priority Data

Mar. 30, 1984 [JP] Japan .................................. 59-62655

[51] Int. Cl.[4] .............................................. C08K 3/40
[52] U.S. Cl. .................................... 524/494; 264/532; 524/605
[58] Field of Search ................. 524/494, 605; 264/532

[56] References Cited

U.S. PATENT DOCUMENTS

| | | | |
|---|---|---|---|
| 3,733,309 | 5/1973 | Wyeth et al. | 264/DIG. 33 |
| 4,476,272 | 10/1984 | Pengilly | 524/605 |
| 4,496,517 | 1/1985 | Kinoshita et al. | 264/532 |

FOREIGN PATENT DOCUMENTS

| | | | |
|---|---|---|---|
| 54-121887 | 9/1979 | Japan | 264/532 |
| 56-34432 | 4/1981 | Japan | 264/532 |

*Primary Examiner*—Lewis T. Jacobs

[57] ABSTRACT

This invention provides a biaxially oriented container which can be very easily molded by extrusion or injection stretch blow molding and which exhibits satisfactory hat resisting property and pressure resisting property even if the content of glass fibers is less than 10 weight %.

6 Claims, No Drawings

BIAXIALLY ORIENTED CONTAINER EXCELLENT IN HEAT RESISTING PROPERTY AND PRESSURE RESISTING PROPERTY

BACKGROUND OF THE INVENTION

1. Field of the Invention

This invention relates to a biaxially oriented container formed of a thermoplastic resin containing glass fibers.

2. Description of the Prior Art

Containers biaxially oriented by stretch blow molding thermoplastic resins such as polyethyleneterephthalate resin, polyvinyl chloride, etc. are excellent in gas barrier properties and mechanical strength as compared with containers obtained by blow molding and have a wide application not only for beverages but foods, cosmetics, medicines, etc.

Particularly, biaxially oriented containers formed of polyethyleneterephthalate resin increase in demand year after year but are low in glass transition point similarly to vinyl chloride resin. Even if the mechanical strength of containers is materially increased by biaxial orientation, there is a limitation in heat resisting property. In the case where the container is used as a container for contents whose filling temperature is above 70° C., is has been necessary to impart the heat resisting property thereto by some means. When the container is used as a container for contents having pressure such as carbonated beverages even if the contents are low in filling temperature, there poses problems in that a bottom of a container is deformed due to an increase in internal pressure resulting from elevation of temperature not only to lose a self-supporting property as a bottle but result in explosion due to the shock at the time of falling.

As a means for solving these problems noted above with respect to the biaxially oriented containers, there has been employed a method for heating a stretch blow molded container at a higher temperature than the glass transition point to stabilize it against heat. Even by such a method, the heat resisting property is merely improved for a temperature in the vicinity of glass transition point but the durability for a higher temperature than the firstmentioned temperature and pressure under the high atmospheric temperature.

According to another approach, glass fiber is mixed into polyethyleneterephthalate resin in an attempt of enhancing the heat resisting property and the pressure resisting and further the gas barrier property and the like by said glass fiber. However, the moldability resulting from stretch blow molding of thermoplastic resin containing glass fibers varies with the content of glass fibers. The more content, the better various properties are obtained but conversely stretch blow molding becomes difficult to perform.

Accordingly, even the content of glass fibers has a limitation for reason in terms of molding, and in the content within the moldable range, the gas barrier property can be enhanced to some extent but satisfactory heat resisting property and pressure resisting property may not be obtained.

SUMMARY OF THE INVENTION

In view of the foregoing, the present inventor has found a new biaxially oriented container containing glass fibers as the result of repeated studies on biaxially oriented containers formed of thermoplastic resin excellent in heat resisting property and pressure resisting property, even if the content of glass fibers is within the range capable of performing stretch blow molding, particularly containers formed of polyethyleneterephthalate resin, vinyl chloride resin, etc.

It is an object of this invention to provide a biaxially oriented container which can be very easily molded by extrusion or injection stretch blow molding heretofore used and which exhibits satisfactory heat resisting property and pressure resisting property even if the content of glass fibers is less than 10 weight %.

It is a further object of the invention to provide a biaxially oriented container excellent in heat resisting property and pressure resisting property which can be used widely as containers for beverages and foods, and carbonated beverages which require heating and filling, and as containers for cosmetics, medicines, liquers, etc. and which can sufficiently withstand internal pressure even under high atmospheric temperature to maintain a self-supporting property and not being attended by explosion.

The present invention having the above-described objects provides a container formed by biaxially orienting a thermoplastic resin containing glass fibers to a value more than 3 of area stretching magnification, said container having said glass fibers of 0.3 to 10 weight % and being thermally fixed in the range of temperature from 70° to 180° C.

Glass fibers that may be used for the present invention have a fiber diameter of 5 to $20\mu$, and a fiber length of 1 to 6 m/m, preferably, have the ratio of length to diameter in the range from 200 to 300, which can be fine particles of glass as the case may be.

The content of glass fibers to resins is 0.3 to 10 weight %, preferably 1.5 to 4 weight %, but said content varies with the shape and use of containers to be molded. However, if the content of glass fibers is less than 0.3 weight %, the strengthening effect by the glass fibers may not be achieved, and if the content exceeds 10 weight %, it becomes extremely difficult to effect molding by a normal stretch blow molding method.

A biaxially oriented container in accordance with the present invention may be molded by axially stretching a preliminary molded body extruded or injection molded before hand at a temperature in the vicinity of glass transition point, and blowing air therein to expand it fully in the cavity.

Glass fibers are contained in resins by when a preliminary molded body is formed, evenly adding a predetermined quantity thereof to the resins and mixing them with the resins within an extruding or injecting heating cylinder, or preparing a master batch of high content to mix the master batch with the resin in a predetermined ratio and containing them in the resins.

Preferably, processes from molding of said preliminary molded body to molding of a biaxially oriented container having a value of more than 3 of area stretching magnification (product of longitudinal stretching and lateral stretching) are continuously carried out. Molding is possible to make even by a cold parison system in which a preliminary molded body cooled to a room temperature is again heated to a glass transition temperature to stretch blow mold it. However, this molding method is difficult to make adjustment of temperature of a preliminary molded body at the time of stretch blow molding as compared with a hot parison system in which stretch blow molding is effected while maintaining a temperature of the preliminary molded body at a level in the vicinity of glass transition point.

DESCRIPTION OF THE PREFERRED EMBODIMENTS

Glass fibers having a fiber length of 3 m/m and a fiber diameter of 10μ in the amount of 2.2 weight % were added to polyethyleneterephthalate resin (TEIJIN, LTD., TR-8550), they were mixed with resins within an injection cylinder and thereafter the resins were injected into an injection mold to form a preliminary molded body having a bottom in which the glass fibers were evenly mixed.

This preliminary molded body has a weight of approximately 29 g with a neck integrally formed with a support ring. The preliminary molded body was released at a temperature as high as possible and immediately thereafter, the internal temperature was adjusted, and then it was stretch blow molded into a bottle of 500 ml having a value of more than 3 times of area stretching magnification within a blow mold heated to a temperature from 70° to 180° C. Simultaneously with molding, the container was heated by the blow mold for a predetermined period of time, and thereafter, it was released from the blow mold and a thermally fixed biaxially oriented container was removed.

In the thus molded biaxially oriented container, the resin present between the glass fibers gives rise to thermal shrinkage by the heating after molding and becomes stabilized against the temperature below the heating temperature. In addition, the resins were strengthened by the glass fibers to increase the buckling strength.

One example of the molding conditions is given below:
Machine used: ASB—50 (NISEEI ASB MACHINE CO., LTD.-made)
Temperature of injection cylinder: 270°–280° C.
Temperature of injection mold: 10°–12° C.
Temperature of preliminary molded body: 100° C.
Blow pressure (air): 14 Kg/cm$^2$
Blowing time: 12 sec.
Temperature of blow mold: 105° C.

It will be noted that a container can be thermally fixed by a blow medium without heating the blow mold, in which case the temperature of blow medium is set to 200° to 250° C. and blowing is maintained for 3 to 10 seconds.

Next, the performance of the biaxially oriented container in accordance with the present invention is shown as well as comparative examples.

Shrinking Percentage of Hot Water

Hot water at 90° C. is filled in a bottle, and the content of the bottle after it has been left alone for 12 hours was measured.

$$\text{Shrinking percentage} = (V_o - V/V_o) \times 100\%$$

where
$V_o$: Volume of bottle before hot water is filled
$V$: Volume of bottle after hot water is filled.

Buckling Strength

A tension/compression testing machine TCM-500 of SHINKO TSUSHIN KOGYO CO., LTD.-made was used and a load was applied to an empty bottle vertically at a corss head speed of 500 mm/min. to obtain the maximum load when the bottle is deformed.

Pressure Resisting Strength (under high pressure)

A bottle filled with 3.6 Volume of $CO_2$ gas (or $CO_2$ 7 g) was immersed in a 76° C. thermostatic oven for 20 minutes to check dimensions of parts and changes in external appearance. Gas pressure of 3.6 Volume at 76° C. is approximately 12–13 Kg/cm$^2$. Elongating percentage of dimensions of parts was calculated by the following equation.

$$\text{Elongating percentage} = (A - A_o/A_o) \times 100$$

where
$A_o$: Dimension prior to immersion into 76° C. thermostatic oven
$A$: Dimension obtained after leaving alone at a low temperature for 12 hours after immersion into 76° C. thermostatic oven.

As described above, the biaxially oriented container in accordance with the present invention possesses the advantages, which cannot be attained by prior art containers, that it is excellent in heat and pressure resisting properties and may be used as a container for contents to be filled at a high temperature and as a pressure container for carbonated beverages and the like which can withstand high atmospheric temperature.

What is claimed is:

1. A biaxially oriented container excellent in heat resisting property and pressure resisting property, said container being formed by biaxially orienting a thermoplastic resin containing glass fibers to a value more than 3 of area stretching magnification, characterized in that said container contains said glass fibers in an amount of 0.3 to 10 weight % and is thermally fixed in the range of temperature from 70° to 180° C.

2. The biaxially oriented container excellent in heat resisting property and pressure resisting property as

|  | Content of glass fiber (%) | Temperature of blow mold (°C.) | Shrinking percent of hot water (%) | Buckling (Kg) | Pressure resisting strength bolt elongation percentage (%) | | | External appearance |
|---|---|---|---|---|---|---|---|---|
|  |  |  |  |  | Total height | Dia. of body | Outer doa. of support ring |  |
| Embodiment 1 | 2.2 | 105 | 0.8 | 65.5 | 2.8 | 3.1 | 0.9 | Unchanged |
| Embodiment 2 | 2.2 | 75 | 2.6 | 65.6 | 3.1 | 3.4 | 2.1 | Unchanged |
| Comparative example 1 | 2.2 | 25 | 3.4 | 65.6 | 3.6 | 3.6 | 6.3 | Partly deformed |
| Comparative example 2 | 0 | 25 | 25.4 | 47.5 | 6.0 | 8.9 | 21.7 | Deformed | defined in claim 1 wherein said thermoplastic resin comprises polyethyleneterephthalate.

3. The biaxially oriented container excellent in heat resisting property and pressure resisting property as defined in claim 1 wherein said glass fiber is in the range of 5 to 20μ of fiber diameter and 1 to 6 mm of fiber length.

4. The biaxially oriented container excellent in heat resisting property and pressure resisting property as defined in claim 3 wherein said glass fiber has a ratio of length to diameter in the range from 200 to 300 and said amount of glass fibers is 1.5 to 4 weight percent.

5. The biaxially oriented container excellent in heat resisting property and pressure resisting property as defined in claim 2 wherein said glass fiber is in the range of 5 to 20μ of fiber diameter and 1 to 6 mm of fiber length.

6. The biaxially oriented container excellent in heat resisting property and pressure resisting property as defined in claim 5 wherein said glass fiber has a ratio of length to diameter in the range from 200 to 300 and said amount of glass fibers is 1.5 to 4 weight percent.

* * * * *

UNITED STATES PATENT AND TRADEMARK OFFICE
CERTIFICATE OF CORRECTION

PATENT NO. : 4,567,224
DATED : January 28, 1986
INVENTOR(S) : Daiichi Aoki; Yoshinori Nakamura; Hiroyuki Orimoto It is certified that error appears in the above-identified patent and that said Letters Patent are hereby corrected as shown below:

In the headings read --[73] Assignee: Nissei ASB Machine Co., Ltd., Japan--.

In the Abstract line 4 for "hat" read --heat--.

Column 1, line 26, for "is" read --it--.

Column 2, line 49, delete "by".

Signed and Sealed this

Twentieth Day of May 1986

[SEAL]

Attest:

DONALD J. QUIGG

Attesting Officer

Commissioner of Patents and Trademarks